United States Patent [19]

Hadley, Jr.

[11] Patent Number: 4,574,691
[45] Date of Patent: Mar. 11, 1986

[54] NUTCRACKER

[76] Inventor: Donald Hadley, Jr., 7671 Derby La., Cotati, Calif. 94928

[21] Appl. No.: 587,174

[22] Filed: Mar. 7, 1984

[51] Int. Cl.⁴ ............................................. A23N 5/00
[52] U.S. Cl. ........................................ 99/583; 99/581
[58] Field of Search .......................... 99/568, 571–573, 99/574, 577, 579, 580, 581–583; 30/120.1, 120.2; D7/98; 100/257, 269 R, 293, 902

[56] References Cited

U.S. PATENT DOCUMENTS

| | | | |
|---|---|---|---|
| 1,153,433 | 9/1915 | Kittrell | 99/578 |
| 1,318,182 | 10/1919 | Schiemer | 99/579 |
| 1,400,099 | 12/1921 | Pueppke | |
| 1,555,518 | 9/1925 | Ramey | 99/578 |
| 2,133,529 | 10/1938 | Benson | 99/579 X |
| 2,226,330 | 12/1940 | Symone | 99/571 X |
| 2,700,994 | 2/1955 | Welfel | |
| 3,151,352 | 10/1964 | Hagen et al. | D7/98 X |
| 3,310,083 | 3/1967 | Jennings | 99/579 |
| 4,333,395 | 6/1982 | Kurtz | 100/233 |
| 4,345,518 | 8/1982 | Cash et al. | 100/98 |
| 4,377,970 | 3/1983 | Kenkel | 99/572 |

*Primary Examiner*—Timothy F. Simone
*Attorney, Agent, or Firm*—Owen, Wickersham & Erickson

[57] ABSTRACT

A nutcracker, comprising a tubular anvil with an annular end wall having a series of axial projections and recesses, for receiving an end portion of a nut thereagainst, a blade-like member with a narrow blade-like edge facing the anvil for engagement with the other end of the nut, and a lever or other member for moving said blade-like member toward said anvil with a nut between them.

7 Claims, 7 Drawing Figures

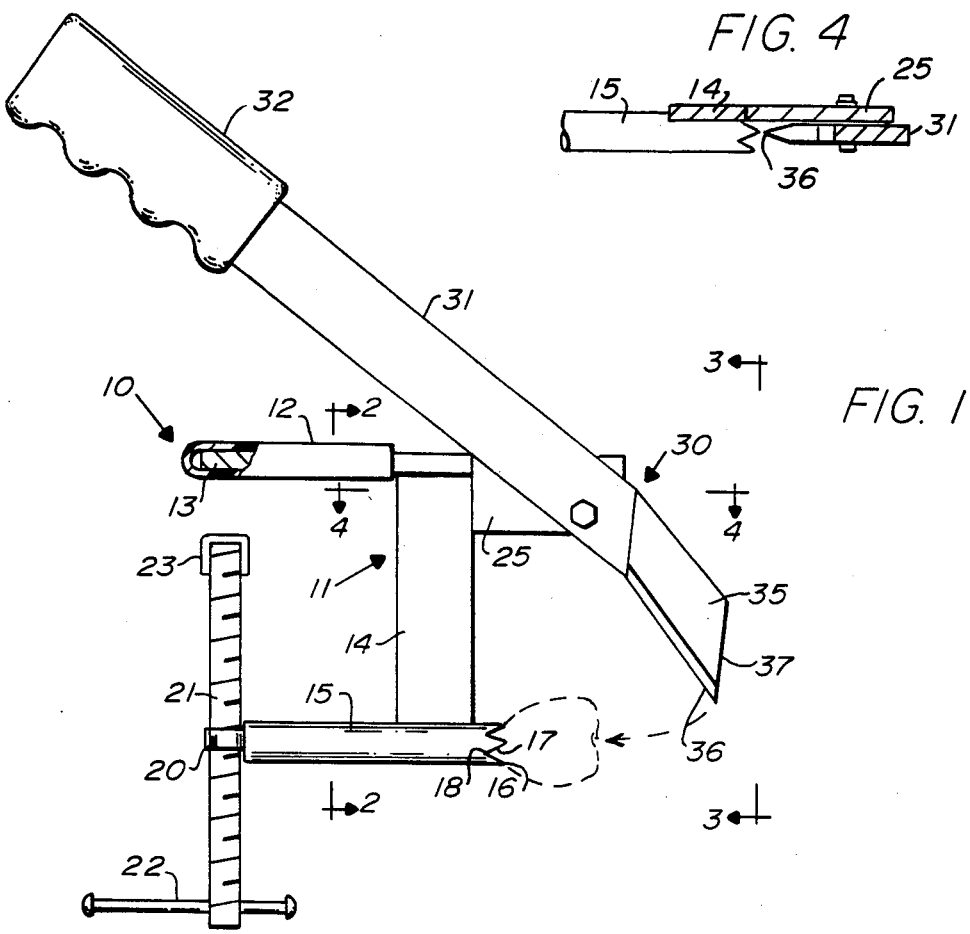
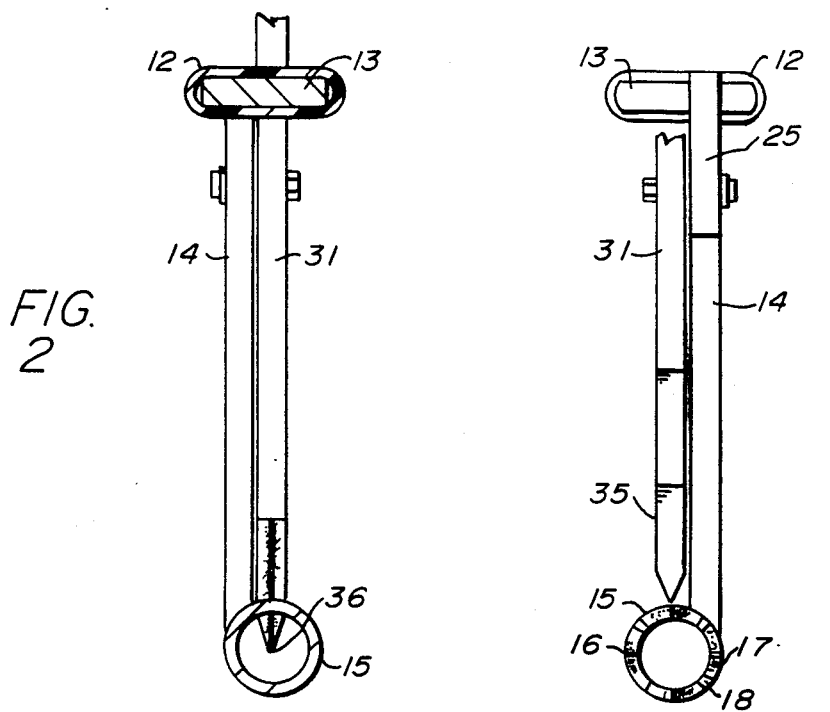

NUTCRACKER

This invention relates to an improved nutcracker. The invention is applicable both to commercial nutcrackers and to home nutcrackers, and to both machine and manual operation.

BACKGROUND OF THE INVENTION

Nutcrackers have been around a long time, but few of them have proved really satisfactory. Most of them have worked on the principle of crushing a nut, and many of them have done so with a construction which made the operation very slow and unsatisfactory in other ways. For example, some nutcrackers have had a socket in which one end of the nut was inserted, then a threaded member placed another socket up against the nut, and between these two sockets the nut was crushed. This rarely resulted in getting the nut meat out whole, or in halves. Even if done carefully and slowly the cracking tended to take place suddenly and the nut meats were often fragmented. Moreover, the shells and nut meats tended to be scattered around because the nut reacted to the crushing forces with kind of a explosive reaction.

Among the objects of the present invention are the following: to provide a nutcracker which is efficient and rapid, whether in home operation or factory operation; to provide a nutcracker which produces a very large percentage of whole or half nut meats when used with nuts such as walnuts and pecans; to provide a nutcracker from which the cracked nuts simply fall down into a collecting container, from which the nut meat and shells can be retrieved and readily separated; to provide a lever type action for home use which can be operated not only with precision, but also with rapidity to achieve a very large percentage, of whole or half nut meats; and to provide a commercial unit which can operate rapidly in achieving a very large percentage of whole or half nut meats.

SUMMARY OF THE INVENTION

The invention employs a novel combination of a narrow blade-like member with tubular socket-like anvil having a specially shaped annular end wall. This end wall has a series of axial projections and recesses, the projections being narrow and nearly sharp, though they may be rounded. This anvil receives one end of the nut to be cracked, the nut engaging against the projections, so that any forces there are concentrated at a few points. The blade-like member has a narrow blade-like edge that faces the anvil and engages the other end of the nut. Force applying means is used to move the blade-like member toward the anvil with the nut between them, and the anvil and blade-like member both tend to cut into the nut, as well as to apply force against it, so that the applied forces are concentrated in very small areas. The forces are not usually applied to give a sharp blow; it is exerted rather smoothly, though not gradually. They act quickly to crack the shell, and if properly used, leave the nut meat intact.

In an embodiment for home use, the tubular anvil may be mounted on a vice-like clamp that can be attached to a bread board, a table, a counter, or other horizontal surface, and the blade-like member is preferably pivotally mounted for a swinging movement toward the socket of the anvil.

In a factory-type operation, the anvil may be permanently placed at one end of a work area, and used in conjunction with a series of blade-like members mounted perpendicularly on an endless chain which propels them toward, but not against, the convoluted anvil to cut or break into the nut's shell and then to clear the anvil and to help push any material remaining close to it to fall down below.

Preferably, there is a series of such anvils, and a series of such chains, with the blade-like members arrange on the chains to act one at a time to crack the nuts each at a different time rather than simultaneously. There may be rollers in between the chains to help align the nuts with the chains and to lie in between the successive blade-like members. The blades extend above the chains, engage the nuts, and drive them first toward the anvil, then against it, and then, with the aid of the anvil help crack the nuts.

Other objects and advantages of the invention will appear from the following description of some preferred embodiments.

BRIEF DESCRIPTION OF THE DRAWINGS

FIG. 1 is a view in side elevation partially broken away of a hand operated nutcracker embodying the principles of the invention and adapted for home use and the like. Portions are broken away and shown in section. The blade-like member is shown in two different positions, one in which it approaches the nut, and one at the end of its stroke. Cracking of the nut takes place in between these two positions.

FIG. 2 is a view in section taken along the line 2—2 in FIG. 1. The blades shown in its forward position, at the end of its stroke.

FIG. 3 is a view in end elevation taken along the line 3—3 in FIG. 1, with the blade tipped backward, to open up the space between it and the socket.

FIG. 4 is an enlarged view partially in section showing the blade in its intermediate position.

DESCRIPTION OF SOME PREFERRED EMBODIMENTS

Figure 5:
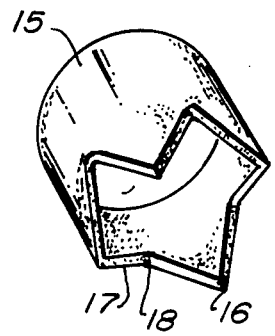
FIG. 5 is an enlarged perspective view of the end portion of the anvil of FIGS. 1-4.

A Hand Operated Unit For Home Use

FIGS. 1-5 show a nutcracker 10 embodying the principles of the invention and adapted for home use. This nutcracker 10, assembled as a single unit, includes a main frame 11 having an upper horizontal portion 12 which is preferably either padded or coated with rubber or other resilient material 13 so that it will not scar the table, counter, or the like to which it is mounted. Depending from the upper portion 12, the frame 10 has a vertical metal bar 14 which is secured to the portion 12, as by welding or the like.

At the bottom of the bar 14 is secured a tubular member 15 providing the anvil 16 at one end. As shown in FIG. 5, the anvil 16 comprises an end wall or socket of the tube 15, shaped to provide an undulating axial configuration, so that the nut bears against a series of crests 17, with troughs 18 in between. The anvil 16 is normally mounted horizontally, so that the nut is held to one side of and against the anvil 16 and, when cracked, can drop into a bucket, which is not shown.

The opposite end of the tube 15 which provides the anvil 16 is provided with an internally threaded nut 20, welded thereto. A vertical screw 21 extends through the nut 20 and provided at its lower end with a handle 22 extending loosely through a diametral hole. At its upper end, the screw 21 has a resilient cup 23, preferably of elastomer. To install the unit 10, the screw 21 is moved by the handle 22 so that a table or breadboard is gripped between the resilient members 23 and 13, this firm gripping holding the nutcracker 10 ready for action.

The rigid frame 11 also has a horizontal bar 25, preferably near the upper end of the vertical bar 14 and the top extending out to side opposite from the member 12. The bar 25 has a pivot opening 26 through it.

The movable part of the nutcracker 10 comprises a shaped bar 30 having a handle portion 31, which may be provided with a suitable resilient grip sleeve 32. There is a pivot opening 33 through the bar 30 near the lower end of the handle portion 31, and a suitable bolt or rivet 34 is provided to go through the openings 33 and 36, so that the bar 30 is pivoted to the bar 25. On the other side of the pivot, the handle terminates in a blade like member 35 which is set at an angle (e.g., 30°) to the handle portion 31. The blade-like member 35 has a narrow forward blunted edge 36 to engage against the nut, and the rear portion 37 the same thickness as the bar 30. The lower end 38 of the blade-like member 35 may cross the latter at an angle, but this is not critical.

While the nut is held briefly in the socket-like anvil 16, or more specifically, against the crests 17 of the anvil 16, the handle 31 is manipulated to force the blade-like edge 36 against the other end of the nut. The sharply concentrated forces crack the shell and, by skill acquired in only a few moments of operation, the user knows approximately how much pressure to use to obtain whole or half meats, and can easily sense the timing and feel so as to leave the nut meats undamaged, while cracking the shell.

Figure 6:
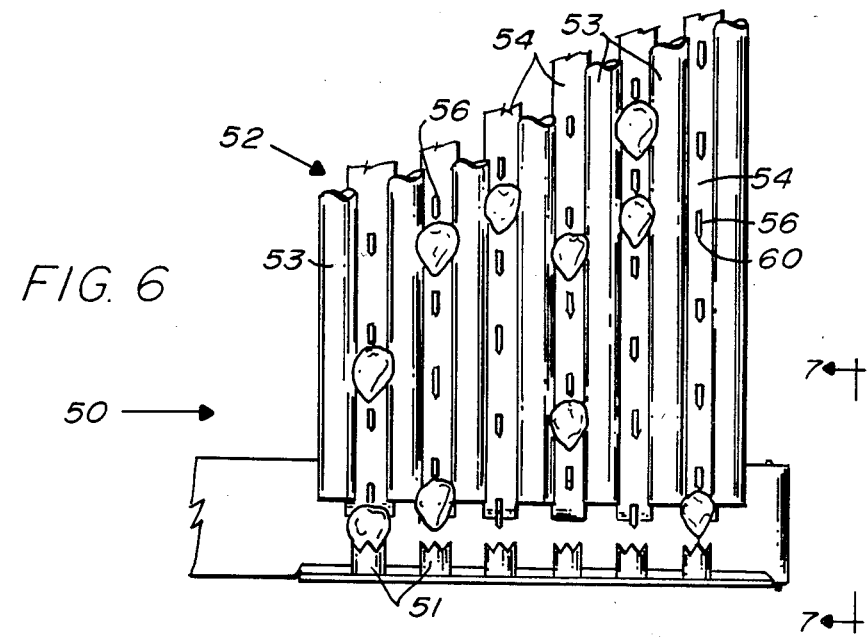
FIG. 6 is a fragmentary top plan view of a modified form of the invention adapted for factory operation and comprising a series of anvils, and an even larger series of blade-like members, each blade being one of a series of blades mounted on individual chains, one chain per anvil.
Figure 7:
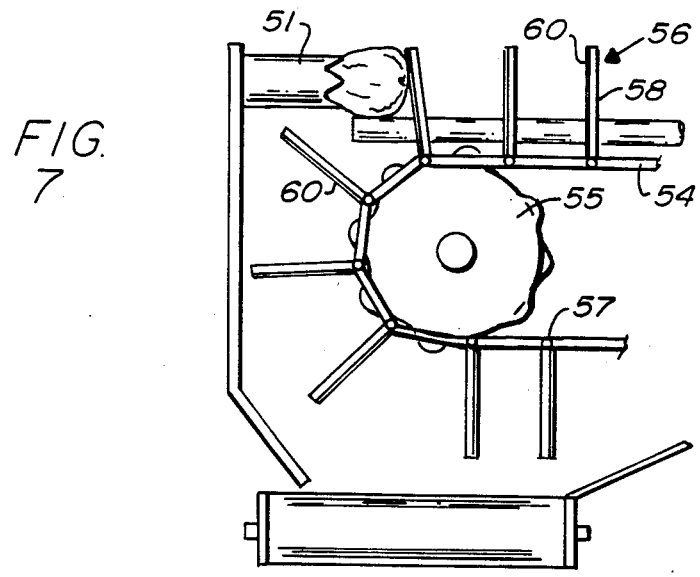
FIG. 7 is an enlarged fragmentary view in elevation of a portion of the apparatus adjacent one of the anvils.

A Factory Type Device (FIGS. 6–7)

FIGS. 6 and 7 show a nutcracker 50 which can be used for large scale nutcracking. A series of anvils 51 (there may be twenty or thirty or more, for example) are mounted at one end of a table-like formation 52 made up of a spaced series of rollers 53, which can be rotated in either direction by a suitable motor, not shown. The table 52 may be about four feet long. The rollers 53 are spaced apart, and the anvils 51, which are basically like the one shown in FIGS. 1–5, as regards their active end portions, lie midway between the rollers 53 at one end of the table 52.

A series of endless chains 54 are mounted below and midway between the rollers 53, passing over sprockets 55. At suitable intervals, depending upon the maximum length of the nuts being processed, blade-like members 56 project upwardly from each chain 54. Preferably, each blade-like member 56 is secured individually to the chain 54 by a bolt 57, so that it can replaced if there is any breakage. As the chain 54 is driven around its sprockets 55, it moves the blades 56 along an upper reach and towards the anvils 51, the blade-like member 56 being centered relative to the rollers 53. Batches of nuts may be fed from a hopper, or otherwise onto the table 52 at the opposite end from the anvils 51, and the rollers 53 assure that the nuts will fall into the spaces between the rollers 53, while being supported by the rollers 53 so that they will not fall through between them, dimensions being purposely determined to suit the nut-typed used.

As the blades 56 move forward from the distal end of the table 52, each one picks up a single nut, the space between blades 56 being too small to accommodate two nuts but adequate to accommodate a single nut. As the blades 56 move forward, there will be soon a nut between each pair of blades. When a blade 56 forces the nut against the anvil 51, as shown in FIG. 2, the blade 56 actually tends to cut into the shell and to crack it. As the nut is cracked, the blade 56 begins rounding the corner with its chain 54, helping to clear the anvil 51 of any shell that might accidentally remain. This continues and can be rapid.

Preferably the chains and their blades are staggered, relative to each other rather than having all the blades located parallel to each other. For example, if there are a series of twenty chains 54 and anvils 51, the cracking will be rather uniform, the chains being so synchronized that only one nut is cracked at a time and all twenty chains 54 participate in cracking one nut before the first chain 54 cracks a second nut. With this staggering or spacing bringing a blunted blade edge against its nut at about 1/20th the distance along the machine, nuts are cracked nearly continuously, thereby meaning that less total force need be applied to the chains.

Each blade 56 has a main supporting shank 58 with a forward edge 60 which goes in toward a nearly sharp edge. The sharpness of the edge can be varied to suit the type of nut, but usually it is sufficient to have the forward edge be, say, about 1/32 inch across. Cracking is certain, rapid, and effective, and results in a very large percentage of whole nuts, especially as compared with what most nutcracking apparatus are able to do.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A nutcracker, comprising
   a main frame having a tubular anvil with an annular end wall at one end for receiving an end portion of a nut, and an internally threaded member at its opposite end, said main frame also having a horizontal upper member parallel to said anvil and spaced therefrom, a vertical member connecting said upper member to said anvil and a pivot support portion opposite said horizontal upper member and connected to said vertical member,
   vise means for securing said main frame to a horizontal support, said vise means comprising
   a vertical threaded member connected to said anvil through said internally threaded member with a resilient cup at its upper end, said vertical threaded member being aligned perpendicular to said anvil, and with a handle at the lower end in a plane parallel to said anvil with said cup facing said horizontal upper member, said upper member having a resilient coating thereon, and a lever arm pivoted to said pivot support portion of said main frame and having a handle portion extending thereabove and an angled portion therebelow with a blade-like member having a single narrow-edged blade-like portion facing and movable toward said annular end wall of said anvil.

2. The nutcracker of claim 1, wherein said angled portion lies at about 30° to said handle portion in the same plane, so that said single narrow-edged blade-like portion and anvil are aligned perpendicularly to each other when a nut is between them.

3. A nutcracker, comprising a tubular anvil mounted in a stationary position, with an annular end wall having a series of axial projections and recesses, for receiving an end portion of a nut thereagainst, a series of blade-like single members with a narrow blade-like edge diametrically opposed to said anvil for engagement with the other end of the nut, mounted to and propelled from an endless chain at spaced distances, corresponding to the length of nuts, moving towards but not against said anvil, and force applying drive means for moving said chain, to move each said blade-like member thereon toward said anvil with a nut between said blade-like member and said anvil, whereby applied forces are concentrated over very small areas.

4. The nutcracker of claim 3 having guide means on each side of said chain and to guide the nuts into the spaces between successive blade-like members.

5. The nutcracker of claim 4 having series of said anvils, each having its own chain, and said guide means comprises a series of rollers parallel to the chains, the rollers being spaced apart, with the blade-like members in between.

6. The nutcracker of claim 5 wherein the respective chains are arranged with the blade-like members of each chain so spaced relatively to the blade like members of the other chains, so that they approach the anvil at different times so as to crack nuts successively.

7. The nutcracker of claim 3 wherein each of said blade-like single members is a vertical rectangular bar with a blunted blade-like forward edge facing the anvil.

* * * * *